(No Model.) 5 Sheets—Sheet 1.
W. J. EDWARDS.
WAGON LOADER.
No. 442,517. Patented Dec. 9, 1890.
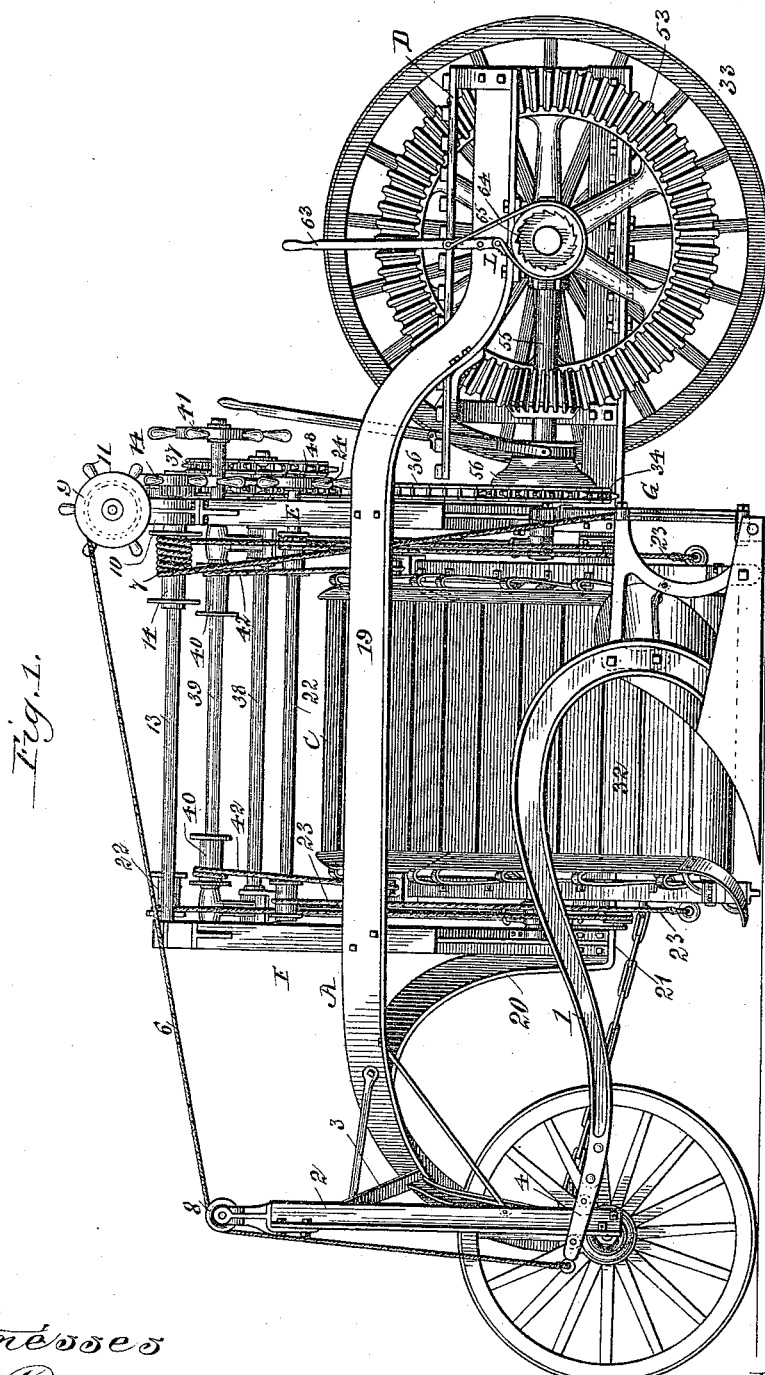
Witnesses
Inventor
William J. Edwards
BY Chas. G. Page
Atty.

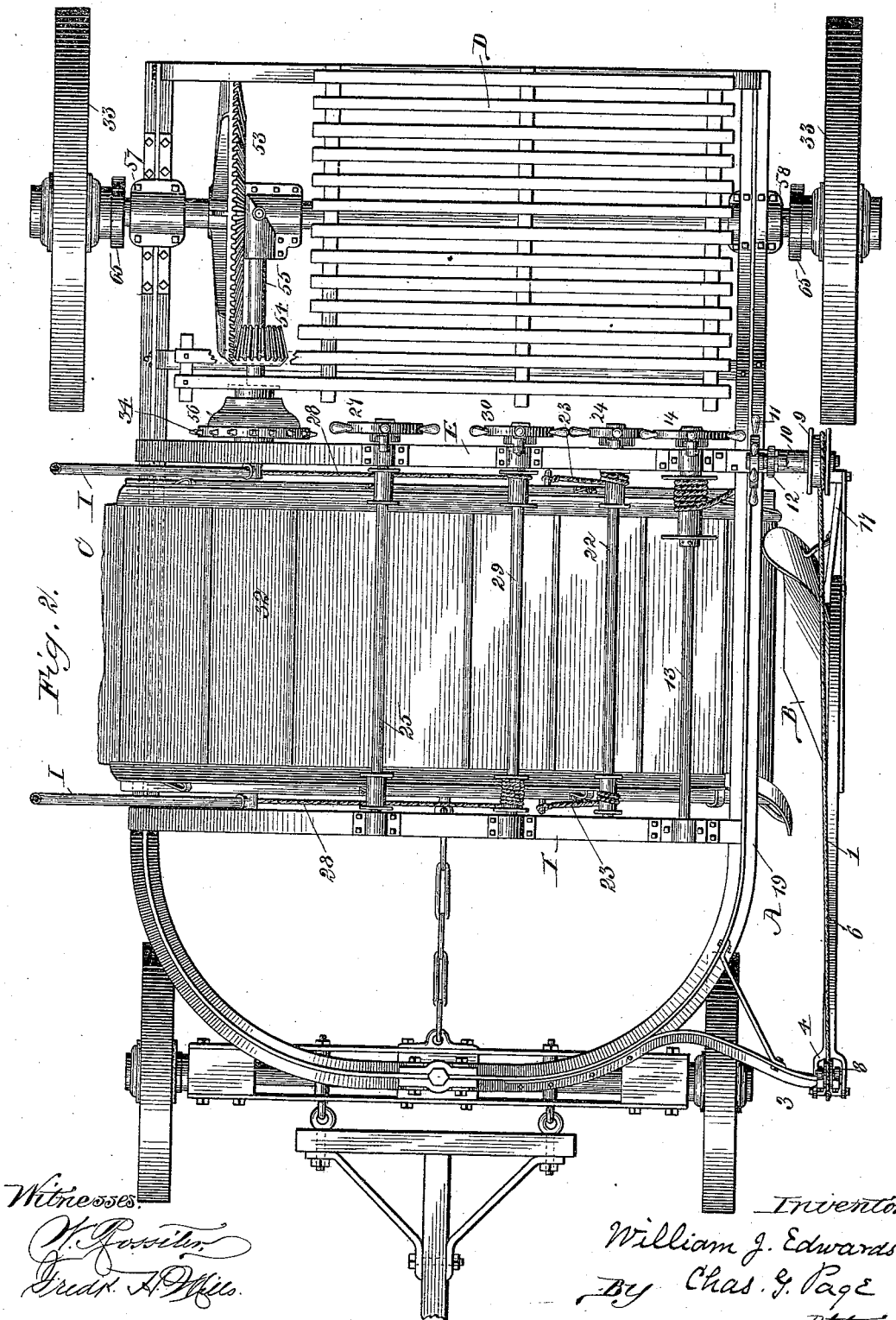

(No Model.)
W. J. EDWARDS.
WAGON LOADER.
No. 442,517. 5 Sheets—Sheet 3.
Patented Dec. 9, 1890.
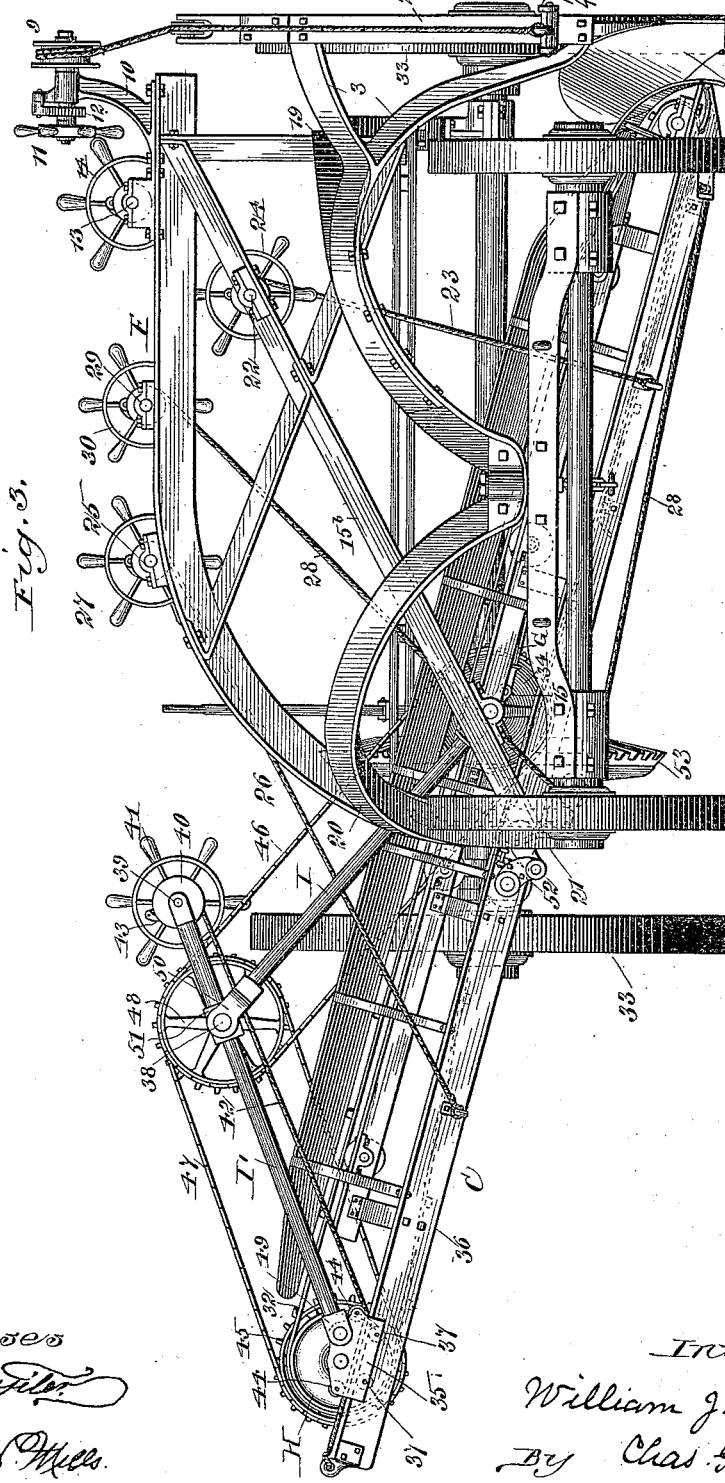
Witnesses
W. Rossiter
Fredk. H. Mills.
Inventor
William J. Edwards
By Chas. G. Page
Atty.

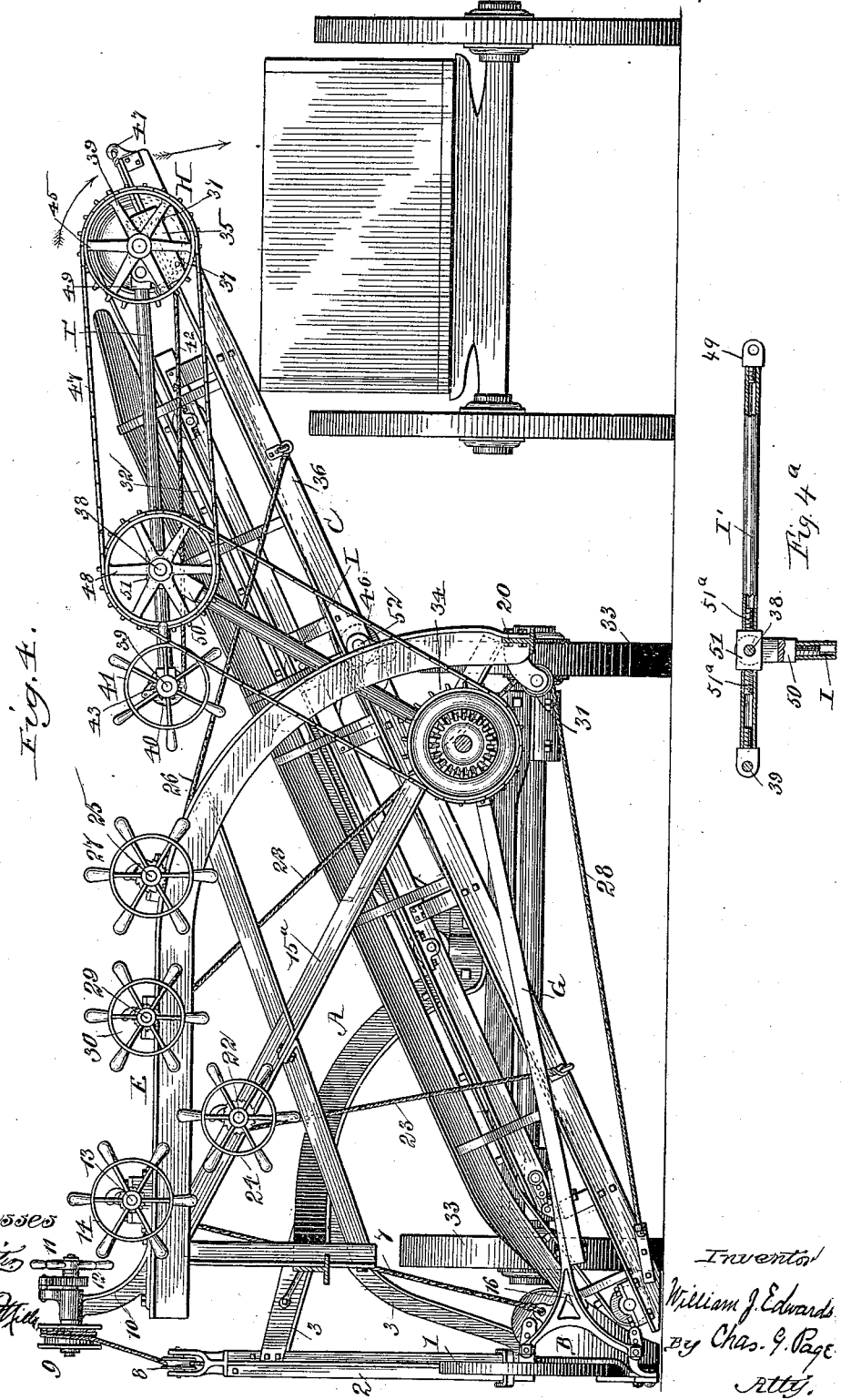

(No Model.) 5 Sheets—Sheet 5.
W. J. EDWARDS.
WAGON LOADER.
No. 442,517. Patented Dec. 9, 1890.
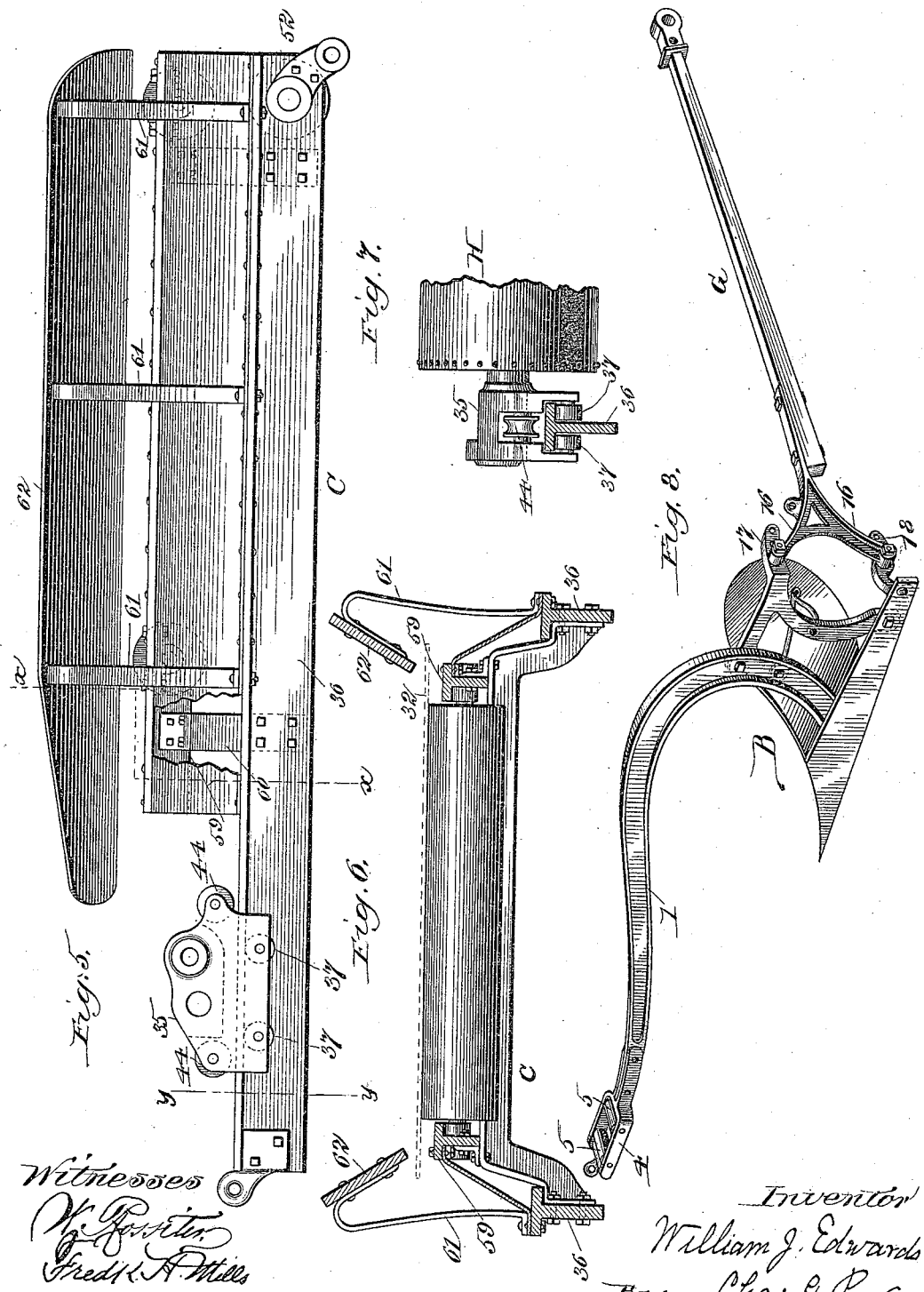
Witnesses
W. Rossiter
Fred't A. Mills
Inventor
William J. Edwards
By Chas. G. Page
Atty.

UNITED STATES PATENT OFFICE.

WILLIAM J. EDWARDS, OF CHICAGO, ILLINOIS, ASSIGNOR TO FREDERICK C. AUSTIN, OF SAME PLACE.

WAGON-LOADER.

SPECIFICATION forming part of Letters Patent No. 442,517, dated December 9, 1890.

Application filed October 19, 1888. Serial No. 288,591. (No model.)

*To all whom it may concern:*

Be it known that I, WILLIAM J. EDWARDS, a citizen of the United States, residing at Chicago, in the county of Cook and State of Illinois, have invented a certain new and useful Improvement in Wagon-Loaders, of which the following is a specification.

The more prominent objects of my invention are to provide a construction of wagon-loader, whereby, while the machine can be operated so as to plow up the soil and deliver the same to an elevator arranged to discharge into a wagon alongside the machine or onto a road-bed when so desired, the plow can be either removed or be permitted to remain inactive and the machine employed for digging either into the side of a bank of earth or down into the ground; also, to simplify the construction and arrangement of the plow, to provide improved means for controlling the plow, and to avoid breakage on the part of the plow and its connection with a stay device; also, to permit the elevator to have a greater diversity and wider range of movements than in wagon-loaders or similar machines as constructed prior to my invention, whereby the elevator may be put to the several uses hereinafter set forth; also, to avoid lateral adjustment of the plow in varying the distance between the plow and the receiving end of the elevator, whereby the plow may at all times be kept in alignment with the line of draft, and as a result thereof avoid undue strains and work with greater freedom; also, to provide improved means whereby the conveyer-belt or carrier can be tightened or loosened by an attendant standing upon the machine; also, to maintain at all times an equable tension throughout the chain or belt gearing employed for driving the conveyer-belt or carrier, and, finally, to provide certain novel and improved details, all serving to promote the general efficiency of the machine.

In a wagon-loader characterized by the several features of my improvement the plow is suspended at one side of the machine by means of suitable raising and lowering devices. The forward end of the plow-beam has a sliding jointed connection with a standard on the wheeled body-frame of the machine, while the rear end of the plow-beam preferably terminates at the plow. The pivoted stay or controlling bar which is arranged transversely to the line of draft is attached directly to the rear portion of the plow and also has an adjustable connection therewith. The elevator is suspended as a whole by cords or chains (or, as an equivalent thereof, jointed link-connections) in such way that it can be made rigid throughout its entire length, and at the will of an attendant on the machine be tilted, moved longitudinally, and raised and lowered. In connection with the elevator I provide an adjustable stay device whereby the elevator can be made to move endwise in either direction and also be held against running into the plow. In place of arranging the elevator to extend under both sides of the wheeled body-frame, the latter has a low side, over which the elevator extends, in which way no obstruction is placed in the way of raising to any height an elevator rigid from end to end and extending from the plow to and beyond the delivery side of the machine. The bearings for the roll which serves to drive the conveyer-belt or carrier are adjustable upon the elevator-frame and are subject to the action of an adjusting device which can be operated by an attendant standing upon the machine, whereby the conveyer-belt can at the will of an attendant be tightened and loosened without loss of time. The roll which serves to operate the conveyer-belt or carrier can be driven from either or both of the rear supporting-wheels through the medium of a power-transmitting connection. Said power-transmitting connection involves an arrangement of chain or belt gearing, whereby the belt-roll which serves to drive the conveyer-belt or carrier can be driven from a sprocket or belt wheel that is supported from the body of the machine. As a means for preserving an equable tension throughout the belting that is thus employed to operate the conveyer-belt or carrier driving roll, said belting is divided into two endless belts, which are connected together through the medium of a double pulley and respectively applied to a belt-wheel on the aforesaid conveyer-belt-driving-roll and the driving belt-wheel that is supported from the body of the machine, the intermediate double belt-pulley which connects the two driving-belts together as aforesaid, being mounted upon a jointed support, which, while adapting itself to any and all movements or adjustment of either the elevator or the roll which drives the conveyer-belt or carrier, will at all times maintain the axis of the intermediate belt-roll at invariable distances from the axis of said roll which drives the conveyer-belt or carrier and the axis of the driving belt-wheel that is supported from the body of the machine.

Certain other details of improvement are hereinafter more particularly set forth.

In the drawings, Figure 1 represents in side elevation a wagon-loader embodying my invention, the side shown being the plow side of the machine and the nearest rear wheel being removed. Fig. 2 is a top plan view of the machine with a portion of the elevator and portions of the arms or links I broken away. Certain details are also omitted in this figure, so as to more conveniently illustrate other parts. Fig. 3 is a front side elevation of the machine with the tongue or pole removed. Fig. 4 is a view of the machine, partly in rear end elevation and in vertical section, and shows a wagon in position to receive soil from the raised delivery end of the elevator. Fig. 4$^a$ is a detail showing a portion of the elbow-jointed device. Fig. 5 is a detail representing in side elevation the delivery-end portion of the elevator with a portion thereof broken away for convenience of the illustration. Fig. 6 is a section taken through Fig. 5 on line $x\ x$. Fig. 7 is a section taken transversely through one of the side bars 36 of the elevator-frame on line $y\ y$, Fig. 5, and shows in elevation a portion of the roll H for driving the conveyer-belt or carrier and one of the shifting bearings 35 for said roll. Fig. 8 represents in perspective the plow and a stay-bar attached thereto.

In said drawings, A indicates the wheeled body-frame of my improved wagon-loader; B, the plow, and C the elevator, which is arranged whereby it may receive the soil from the plow and carry the same up to a point suitable for discharging it into the wagon.

The wagon-loader is adapted for side delivery, and to such end the elevator is arranged transversely with relation to the body-frame, whereby the lower or receiving end of the elevator may take the soil from the plow that is positioned at one side of the machine and deliver the soil at the opposite side of the latter.

The plow-beam 1 is preferably (but not necessarily) an ordinary goose-neck beam, having its rear end portion terminating at and secured to the plow, whereby a light and simple construction of the plow is provided. As a means for drawing the plow, the forward end of its beam 1 is connected with a standard 2, which latter is in turn rigidly connected with the body-frame A at or near one of the forward corners of the latter in any suitable way—as, for example, by the bracket 3 and any suitable auxiliary brace-rods. The plow-beam has a jointed sliding connection with the standard 2, so as to permit the rise and fall of the plow, and, further, permit the plow to enter the soil at the necessary angle. Said sliding jointed connection is herein conveniently attained by providing the forward end of the plow-beam with a yoke or clevis 4, (see particularly Fig. 8,) which may have a couple of anti-friction rollers 5 set apart so as to receive the standard 2 between them, as in Fig. 1, wherein the anti-friction rollers are indicated in dotted lines. I may, however, dispense with one or both of said rollers.

The plow is suspended by a couple of raising and lowering chains or ropes 6 and 7, which can be operated by an attendant standing upon the rear platform D. The chain or rope 6 is connected with the forward end of the plow-beam and the chain or rope 7 is connected with the rear portion of the plow. The chain or cord 6 is carried up to and over a pulley 8 on the upper end of the standard 2, and from thence passes back to and connects with the elevated winding-drum 9. The shaft of the winding-drum 9 is arranged transversely to the length of the machine and mounted upon a bracket 10, (see Figs. 3 and 4,) and in connection therewith a suitable hand-wheel 11 and a clutch or pawl-and-ratchet device 12 are provided. The chain or cord 7 is carried from the plow directly up to the elevated rotary winding-shaft 13, Figs. 1 and 4, which is arranged parallel with the plow-beam and provided with or formed to provide a drum or enlarged portion 14, whereon the chain or cord can be properly wound. The winding-shaft 13 has its bearings upon a couple of supports or frames E and F, which rise from and are arranged transversely to the length of the body-frame A, it being observed that the frame E also serves as a suitable support for the bracket 10, hereinbefore referred to. The winding-shaft 13 is also provided with a hand-wheel 14 and a suitable clutch or pawl-and-ratchet device.

In Figs. 1, 4, and 8 the stay-bar G is shown attached at one end to the rear portion of the plow. This bar G is arranged transversely to the plow, and while having one end connected therewith said bar is at its opposite end pivotally attached to some suitable bearing—as, for example, to the bearing 15, indicated in Fig. 3, and understood to be rigid with one of the inclined brace-bars 15$^a$, Fig. 4, of frame E. The bar G has an adjustable connection with the plow, so as to permit the plow to be tilted to one side for the purpose of cutting sod, and as a simple and effective mode of thus attaching the bar directly to the plow the bar is provided at one end with a couple of arms 16, whereof one is connected with the upper and the other with the lower rear portion of the plow, which at its upper rear portion has a laterally-arranged bearing 17, provided with a line of holes for the pin or bolt of the upper one of the arms 16, while at its lower rear portion the plow has a similar bearing 18, provided with a line of holes for the pin or bolt of the lower one of the arms 16. It is understood, however, that the plow could be tilted by permanently pivoting one of the arms 16 to the plow and attaching the remaining one of said arms to the plow by an adjustable connection. By thus attaching the bar G directly to the plow in place of attaching it to the beam the feature of breakage which would be incident to the leverage involved in a machine having the said bar attached to the beam is avoided, and, furthermore, the necessity of a heavy beam extending back of the plow is obviated.

When the receiving end of the elevator is in position to take soil from the plow, its said end will be below the level of the side 19 of the body-frame A, which is at the plow side of the machine. The elevator, however, in place of extending from its receiving end upwardly and under the side 20 of the body-frame A at the opposite delivery side of the machine, extends upwardly and over said side of the body-frame. To render such arrangement practical and permit the elevator as a whole to be raised and lowered to a desired extent, the side 20 of the body-frame is depressed, as at 21, Fig. 1, whereby its depressed portion lies in a plane considerably lower than the opposite side 19 of the body-frame. The side 19 may therefore be termed the "high side", and the side indicated by the numerals 20 and 21 the "low" or "depressed" side of the body-frame. By thus providing the body-frame with a low side, over which the elevator extends, a great latitude of up-and-down movement on the part of the elevator is permitted, and when so desired the use of a hinge-joint in the elevator can be dispensed with, since with my present arrangement the delivery end of the elevator can be raised to a suitable height, although the elevator-frame may be permanently rigid throughout its length.

The elevator C is capable of both a longitudinal or end movement in either direction and a tilting movement, whereby it may be brought into various positions, as hereinafter set forth, and to the attainment of said ends I provide the following means: The elevator is at its receiving-end portion suspended from the horizontally-arranged rotary winding drum or shaft 22 by means of suitably-jointed or flexible connections, such as links or chains or ropes 23. Said shaft is mounted upon the bars 15ª and 15ᵇ of the elevated supports or frames E and F, and is provided with a suitable locking device, such as a pawl and ratchet, and with a hand-wheel 24. At a point toward its delivery end the elevator is suspended from the horizontally-arranged rotary drum or winding-shaft 25 by means of suitably jointed or flexible connections, such as links, chains, or ropes 26. (Best shown in Figs. 3 and 4.) Said winding-shaft 25 is also mounted upon the supports or frames E and F and provided with a hand-wheel 27 and any suitable locking device. It will be observed that the chains or ropes 26 connect with the elevator at points beyond the delivery side of the body-frame of the machine, whereby the upper extended portion of the elevator can be suspended from said cords or chains and also be raised or lowered by properly operating the winding-shaft 27. The elevator thus suspended from winding devices by means of cords or chains or like flexible suspension media attached to the elevator toward its receiving end and also attached to elevator toward its delivery end at a point beyond the delivery side of the body of the machine is so balanced as to permit it to be readily operated, and by reason of the suspending cords or chains 26, which connect the extension portion of the elevator that extends beyond the delivery side of the body of the machine with a drum or shaft or other equivalent device arranged above and supported from the body-frame of the machine at a point over or nearly over the middle of said frame—that is to say, a point midway of the sides—the downpull of the portion of the elevator extending from its connection with chains or cords 23 up to its delivery end will, in place of tending to tip the body-frame, pull down upon the same, and thereby throw the weight on the wheels. The elevator thus suspended as a whole by the chains or ropes 23 and 26 is prevented from running into the plow by means of an adjustable stay and shifting device, consisting of one or more, but preferably a couple, of chains or ropes 28, (or, as an obvious equivalent, links,) which serve to connect the elevator with a rotary winding-shaft 29, equipped with a hand-wheel 30 and some suitable locking device and mounted upon the supports or frames E and F.

The chains or ropes 28 or other analogous flexible or jointed connections pass around pulleys 31, that are carried by the body-frame A at its delivery side, as in Fig. 4, wherein one of said pulleys is represented, and said chains or cords are attached to the elevator at or toward the receiving end thereof. By turning the winding-shaft for the chains or cords 28 in one direction the suspended elevator will be permitted to shift by gravity toward the plow, while on the other hand by turning said winding-shaft in a contrary direction the elevator will obviously be drawn endwise and in a direction away from the plow, and hence by simply operating the hand-wheel on said shaft the distance between the plow and the receiving end of the elevator can be varied at will by an attendant standing upon the machine and the elevator adjusted longitudinally with reference to the character of the soil that is to be delivered from the plow. By thus adjusting the elevator relatively to the plow, so as to vary the distance between the two with reference to the character of the soil which the plow is to deliver to the elevator, lateral adjustment of the plow is avoided, and hence the plow can at all times be kept properly in alignment with the line of draft.

While the elevator can be moved endwise in either direction, it can also be raised or lowered bodily, and regardless of its height or adjustment toward the plow the elevator can be tilted so as to raise one end and lower the other, or raise or lower either end without varying the height of the opposite end. Should it be found desirable to provide the conveyer-belt or carrier of the elevator with scoops or shovels for digging or excavating purposes, the elevator thus equipped can be raised and run out over the plow, (or the plow can be detached, if preferred,) whereby the elevator can be used to dig into a bank alongside the machine. Furthermore, the elevator when thus provided with scoops or shovels can be adjusted for digging under the machine, it being understood that it can be positioned for such purposes by properly adjusting the devices by which it is suspended, which said devices, as hereinbefore set forth, permit the elevator to be moved endwise either way and also permit it to be tilted.

The endless carrier or conveyer-belt 32 is driven from the rear wheels 33, which latter can be arranged upon a rotary axle and connected therewith by suitable clutch or pawl-and-ratchet devices adapted to establish connection between the rear wheels and axle during the advancement of the machine, but to release connection between the rear wheels and axle in backing. As a means for thus operating the conveyer-belt or carrier 32 from the rear wheels, the drum or roll H, which is arranged at the delivery end of the elevator, and which serves to directly drive the said conveyer-belt, is in turn driven from a sprocket or belt wheel 34, which latter may be driven from the rear wheels or the rear axle in any known or suitable way. The driving-roll H is mounted in a way whereby it can be shifted in position upon the elevator-frame, in order to tighten or loosen the conveyer-belt or carrier, according to requirements. To the attainment of said end the roll H is journaled in shifting bearings 35, one of which is best shown in side elevation in Fig. 5, and the other in end elevation in Fig. 7. The bearings 35 are arranged to shift or slide upon the elevator-frame or suitable guides thereon, the supports herein selected for said bearings being the side bars 36. When the side bars 36 of the elevator-frame are made of flange or T iron, the bearings 35 can be adapted to fit thereon, as in Fig. 7, wherein I have shown one of said bearings formed to fit and slide upon a bar of T-iron and provided with anti-friction rollers 37, arranged for contact with the under side of the horizontal flanges of the bar or rail. I do not, however, limit myself to the foregoing form of bar, and in place of the anti-friction rolls the bearings can be otherwise fitted to and adapted to be retained and guided upon bars or rails either of T-iron or of any other known or suitable form.

In connection with the shifting bearings for the roll H, I provide means whereby said bearings can be readily shifted by an attendant standing upon some convenient support on the body of the machine—for example, upon the rear platform D. To the attainment of said end I provide an adjusting device, which, while capable of operation for shifting the roll-bearings 35, is so arranged that it will readily adapt itself to any and all movements or adjustments of the elevator. Said adjusting device comprises a couple of arms or links I and a couple of arms or links I', pivotally connected to form a couple of toggle or elbow joints, which are respectively arranged at opposite sides of the elevator. The links I' are pivotally attached to the roll-bearings 35, and the links I are pivotally hung at points farther toward the receiving end of the elevator. The links at one side of the elevator rise somewhat above the plane of the same, and the links at the opposite side of the elevator have a corresponding arrangement whereby the "middle joints" of the toggles (as they may be termed) can be formed by a cross-rod 38, Figs. 1, 3, and 4, arranged over the elevator and serving to provide at its ends suitable pivots for the said joints. By the foregoing arrangement the bearings for the roll H can obviously be shifted or adjusted in position along their supports by operating the toggles, which, being connected together by the cross-rod 38, work in unison, and hence act as a single toggle, the object of forming such toggle of two pairs of links, respectively, at opposite sides of the elevator being to insure the steady and synchronous adjustment of the two roll-bearings 35.

For the broader purposes of my invention I may employ any suitable means for operating the said toggle or jointed adjusting device, which, as hereinbefore set forth, is in the nature of a toggle or elbow joint; but as a matter of further improvement in this direction I support upon the toggle a winding-drum or a rotary shaft 39, carrying a couple of winding-wheels 40 and a hand-wheel 41, and connect these winding devices with the corners of the elevator-frame at its delivery end by means of a couple of chains or cords 42, one for each corner of the frame, as illustrated by Figs. 3 and 4.

By operating the hand-wheel 41, so as to wind up the chains or cords 42, the shortening up of the portions of the cords or chains between their allotted winding devices and their points of attachment to the elevator will operate the toggle device, which, being at one end hung to turn about a fixed axis or center and at the other end connected with the sliding roll-bearings 35, will evidently expand or to some extent straighten out, and thereby shift the roll-bearings in a direction to tighten up the belt, the extent of end-thrust of the links I' and the consequent extent of movement on the part of the roll-bearings being dependent upon the extent to which the cords 42 (or other like connections between the end of the elevator and a winding device upon the toggle) are wound up or shortened. In connection with the hand-wheel 41 and the winding device which is operated therefrom any suitable locking device may be employed—as, for example, a pawl-and-ratchet device 43.

The hand-wheel and winding device for the chains or cords 42 are carried by the links I', which latter are extended somewhat back of their connections with the links I, in order that the shaft for the hand-wheel can have its bearings on the links I' at points which will place the hand-wheel within convenient reach of an attendant standing upon the platform D. By thus arranging the hand-wheel 41 and its accompanying winding device upon the links I' the chains or cords can at any time be operated so as to tighten the belt, which latter will of course loosen itself when the winding device is released; but whether the belt be tight or loose the toggle or elbow joint will freely adapt itself to all movements on the part of the elevator. The operation of the winding device in a way to wind up the cords or chains 42 is in fact the effect of a lever carried by the toggle device and operated in a direction to exert such pull upon a connection between the lever and the upper portion of the elevator that the toggle device will be operated in a way to effect a shift on the part of the roll-bearings 35. The chains or cords 42 preferably pass through openings in the roll-bearings 35, and when thus arranged the openings through said bearings are desirably provided with small pulleys, 44, Figs. 5 and 7, for holding down the chains or cords which may run under said pulleys. It is extremely desirable that such chain or link belting as may be employed for driving the conveyer-belt roll H on the elevator from a sprocket or belt wheel on the body of the machine should under all circumstances maintain an equable tension, regardless of the position or movements of the elevator. To such end I connect a sprocket or belt wheel 45 on the roll H with the driving sprocket or belt wheel 34 through the medium of a couple of driving-belts 46 and 47—such as chain or link belts—and in turn connect these two driving-belts together through the medium of a double sprocket or belt pulley 48, which is arranged upon a jointed support.

The jointed support for the pulley 48 is arranged to yield to all movements of the elevator and at the same time to preserve at all times the axis of the double pulley 48 at invariable distances from the respective axes of the roll H and the driving-belt wheel 34. With a view to simplification, I employ the hereinbefore-described toggle device as a jointed support for the double pulley that serves as a power-transmitting connection between the driving-belts 46 and 47, the double pulley in such case being preferably mounted upon the pivot at the middle joint of the toggle device, as in Fig. 4, wherein the double pulley is arranged upon one end of the rod 38, which, as hereinbefore set forth, serves to provide pivots for connecting the links I with the links I'. By such arrangement the axis of the double pulley 48 (or two pulleys arranged side by side on rod 38) may be kept at an invariable or fixed distance from the axis of the roll H, and in like manner the axis of pulley 48 may be kept at an invariable or fixed distance from the axis of wheel 34, which latter should have its axis in alignment or substantially in alignment with an axis common to the pivots for the lower ends of links, as in Fig. 2, wherein it will be seen that the links I are at their lower ends hung at points directly in alignment with the shaft whereon wheel 34 is arranged. The arms or links of the elbow-jointed or toggled device are capable of adjustment in a way to tighten the belts 46 and 47 when so desired. Thus, for example, the links I' can, as in Fig. 4ª, be adjustably connected with socket-pieces 49, which are pivotally attached to the bearings 35, and the links I can be adjustably attached to socket-pieces 50, which are hung upon the rod or pivot 38. With such arrangement the links I' can be divided and adjustably attached to bearings 51, arranged on rod 38, and the opposing ends of the link-sections thus formed by dividing the links I' can be screwed into the said bearings 51 or screwed upon threaded stems 51ª, with which the bearings can be provided, as will be readily understood without further description. The arms or links I and I' are shown made of gas-pipe, which, while being comparatively light, is exceedingly strong, it being, however, understood that they may be made of any form or construction of rods or bars suitable for the purpose.

The elevator-frame can be made rigid throughout its length, or it can be jointed, as at 52. Should it be desirable to joint the elevator-frame, it should be provided with joints capable of being locked by bolts or the like, so that the jointed frame can be made temporarily rigid throughout its length. For some purposes, however, I may unlock the joints, so as to allow the delivery-end portion of the elevator to be tilted independently of the receiving-end portion, it being seen that in either case the toggle will yield with such portion of the elevator as may be moved. The sprocket or belt wheel 34 is herein driven from the rear axle by a large gear 53, fixed on the axle and engaging a small bevel-gear 54 on a shaft 55, which said shaft is understood to carry a clutch, (indicated at 56,) and suitably adapted for connecting the shaft with the wheel 34. No limitation is, however, placed upon such driving-gear, since the wheel 34 can be driven from the rear wheels by any known or suitable gearing.

The main body-frame A of the machine comprises, as hereinbefore set forth, a couple of side bars, one of which has a depressed portion 21. The depressed or low-side portion 21 of the body-frame extends under the rear axle, which has one of its bearings in a box 57, Fig. 2, secured upon the upper side of said low-side portion. The high side 19 of the body-frame, on the contrary, extends over the rear axle and carries on its under side the axle-box 58. The two sides of the body-frame converge toward the front of the machine and unite at the point where the body-frame thus formed is attached to the front axle by a king-bolt. The part of the body-frame or the point where the side bars of the frame meet and through which the king-bolt passes is rounded or convex on its under face or where it comes in contact with the front axle of the machine, so as to provide a minimum amount of contact surface between said body-frame and axle. The body-frame bears on the front axle only at said rounded part, whereby when one of said wheels is raised it will not strain the body-frame.

The elevator can be provided with the lower side bars 36 for the lower conveyer-belt rolls and with the raised side bars 59, which serve to support the upper conveyer-belt rolls. The side bars 59, Fig. 5, can be supported from the lower side bars 36 by supports 60, and said lower side bars can be provided with arms or stands 61, which support the side boards 62. I do not, however, confine myself to such construction of elevator, since various other known or suitable constructions can be employed. I also provide a brake L, Fig. 1, which will be of particular service in running down a hill. The brake comprises a lever 63 and a flexible steel or other suitable band or strap 64, which passes around a ratchet-hub 65 on the rear axle and at its ends connects with the lever. The said ratchet hub 65 is herein understood to contain a ratchet for pawls that may be carried upon one end of the rear wheel-hub, as is common in grading and ditching machines, and while said ratchet-hub subserves its usual purpose I make it externally cylindric, so that it will provide a simple and sufficiently large bearing or friction surface for the brake-strap.

When so desired, I can employ a jack to raise one of the rear wheels—as, for example, the rear wheel at the delivery side of the machine—and belt-connect such wheel with an engine. By driving the wheel from the engine the conveyer-belt can be operated, and hence, should it be provided with scoops or shovels—such, for example, as have heretofore been used in excavating-machines—I can readily use the machine either for digging out a bank or for digging down into the ground.

What I claim as my invention is—

1. The combination, substantially as hereinbefore set forth, with the standard arranged at the forward portion of the machine, of the plow suspended by raising and lowering devices and having at the forward end of its beam a sliding connection with the standard and pivoted to the frame of the machine in the rear of its point.

2. The combination, substantially as hereinbefore set forth, with the suspended plow, of the bar G, pivotally supported at one end and at its opposite end attached directly to the plow, for the purpose described.

3. The combination, with the suspended plow having at the forward end of its plow-beam a sliding connection with a standard carried by the wheeled body-frame, of the pivoted bar G, attached to the plow, substantially as and for the purpose described.

4. The combination, substantially as hereinbefore set forth, with the suspended plow, of the bar G, pivoted at one end and at its opposite end attached directly to the plow by an adjustable connection, which permits a lateral tilt on the part of the plow, for the purpose described.

5. The combination, substantially as hereinbefore set forth, with the plow, of the pivotally-supported bar G, having at one end the arms 16, one or both of said arms being adjustably attached to the plow, for the purpose described.

6. The wheel-supported body-frame having a high side 19 and an opposite low side 21, and the elevator suspended to extend over the low side of the body-frame, said members being relatively arranged substantially as and for the purpose described.

7. The elevator suspended as a whole by raising and lowering cords or chains and having both a tilting movement and an end movement, substantially as set forth.

8. The combination, with the elevator suspended, substantially as set forth, to permit it to be raised, lowered, tilted, and moved endwise, of an adjustable stay 28, connected with the elevator and arranged for controlling the end movement of the elevator.

9. The combination, with the elevator belt or carrier and roll mounted on shifting bearings carried by the elevator-frame, of a jointed adjusting device connected with said roll-bearings and having a handle or operating device arranged within reach of an attendant upon the machine, whereby said roll-bearings can be adjusted during the operation of the machine, for the purpose set forth.

10. The combination, with the elevator belt or carrier and roll mounted on shifting bearings carried by the elevator-frame, of a toggle or elbow jointed device, such as set forth, connected with said shifting bearings, for the purpose described.

11. The combination, with the elevator provided with shifting bearings for the roll which serves to drive the conveyer-belt or carrier, of a toggle or elbow jointed device, such as set forth, connected with said shifting bearings, and a winding device carried by the toggle and connected with the elevator by one or more chains or cords, substantially as and for the purpose described.

12. The combination, with the conveyer-belt or carrier and roll H, of the bearings for said roll, arranged to slide upon the elevator-frame, a toggle-jointed connection arranged between said bearings and the body-frame of the machine and comprising the arms or links I and I', and the chains or cords connecting a drum or winding device on the arms or links I' with the elevator-frame, substantially as described.

13. The combination, substantially as hereinbefore set forth, with the bodily-movable elevator carrying a roll for driving the conveyer-belt or carrier, of a driving-gear for said roll, comprising a belt-wheel, a driving-belt trained over said roll and belt-wheel, a second driving-belt connecting said belt-wheel with a suitable driving-wheel carried by the machine, and the jointed support carrying a belt-wheel, the axis of the said belt-wheel, being in alignment with the joint of said support, for the purpose described.

14. The combination, substantially as hereinbefore set forth, with the elevator carrying a roll for driving the conveyer-belt or carrier, of the swinging links I and I', pivotally connected together and respectively attached to bearings on the body-frame and bearings on the elevator, and the belt-wheel supported by the links and connecting together a couple of driving-belts, which serve to connect said roll for driving the conveyer-belt or carrier with a suitable driving-wheel carried by the machine, for the purpose described.

15. The combination, with the side bars of the elevator-frame, of the roll H and bearings 35 for the journals of said roll, arranged to slide upon the side bars and having rollers 37 in contact with the same, substantially as and for the purpose set forth.

16. In a wagon-loader, the body-frame A, comprising side bars converging toward and meeting at the front of the machine, where the king-bolt engages said body-frame, the junction of the side bars being rounded, combined with the front axle, with which the body-frame comes in contact only at the rounded junction of its side bars.

WILLIAM J. EDWARDS.

Witnesses:
CHAS. G. PAGE,
N. DICKINSON.